United States Patent [19]

Swarup et al.

[11] Patent Number: 5,206,286

[45] Date of Patent: Apr. 27, 1993

[54] AQUEOUS EMULSION POLYMERS PREPARED WITH CROSSLINKABLE NON-IONIC SURFACTANTS

[75] Inventors: Shanti Swarup; Gregory J. McCollum, both of Gibsonia; Charles M. Kania, Natrona Heights, all of Pa.

[73] Assignee: PPG Industries, Inc., Pittsburgh, Pa.

[21] Appl. No.: 728,807

[22] Filed: Jul. 11, 1991

Related U.S. Application Data

[63] Continuation of Ser. No. 502,973, Apr. 2, 1990, abandoned.

[51] Int. Cl.$^5$ .............................................. C08K 5/04
[52] U.S. Cl. .................................. 524/761; 524/769; 524/611
[58] Field of Search .................. 524/611, 769, 767

[56] References Cited

U.S. PATENT DOCUMENTS

| | | |
|---|---|---|
| 2,601,256 | 6/1952 | Bruson . |
| 3,243,455 | 3/1966 | Pizzini et al. . |
| 4,436,672 | 3/1984 | Naylor . |
| 4,515,775 | 5/1985 | Valerberghe et al. ................ 424/70 |
| 4,552,673 | 11/1985 | Grolitzer ......................... 252/174.22 |
| 4,600,761 | 7/1986 | Ruffner et al. ..................... 526/270 |
| 4,612,142 | 9/1986 | Piorr et al. . |
| 4,618,457 | 10/1986 | Esselborn et al. . |
| 4,792,419 | 12/1988 | Piorr et al. . |

FOREIGN PATENT DOCUMENTS 63-72333 4/1988 Japan .

*Primary Examiner*—Joseph L. Schofer
*Assistant Examiner*—Jeffrey T. Smith
*Attorney, Agent, or Firm*—Linda Pingitore

[57] ABSTRACT

A stable aqueous polymer emulsion contains an aqueous continuous phase, a dispersed polymeric phase which comprises an acrylic polymer and a polyhydroxyl functional, non-ionic surfactant having a repeating polymer unit in the backbone and containing from 3 to 31 hydroxyl groups wherein the hydroxyl groups on the repeating polymer unit are separated by 4 or more carbon atoms and the surfactant is substantially free of oxyethylene units.

7 Claims, No Drawings

AQUEOUS EMULSION POLYMERS PREPARED WITH CROSSLINKABLE NON-IONIC SURFACTANTS

This application is a continuation of application Ser. No. 07/502,973, filed Apr. 2, 1990, now abandoned.

CROSS REFERENCE TO RELATED APPLICATIONS

This application is related to Ser. No. 07/436,968, entitled "Polymerizable Surfactants", filed Nov. 15, 1989, to Tang et al, which is a file wrapper continuation of Ser. No. 209,249, filed Jun. 20, 1988, to Tang et al.

BACKGROUND OF THE INVENTION

The present invention relates to aqueous emulsion polymers and coating compositions prepared therefrom.

Aqueous emulsion polymers are well known and have been used in a variety of applications including inks, adhesives, consumer and industrial coatings. A feature of such emulsion polymers is that the polymeric particles in the emulsion generally require some stabilizing mechanism in order to prevent the particles from agglomerating and settling.

One way in which the particles can be stabilized is by incorporating groups into the polymer which generate ions in water whose charges will repel the charges on other polymeric particles. This repulsion prevents the particles from agglomerating. Another way to stabilize polymer particles is through the use of non-ionic surfactants having both hydrophilic and hydrophobic segments which orient in water to form a steric barrier which prevents agglomeration. Additionally, conventional ionic emulsifiers are also used to provide charge repulsion and therefore prevent agglomeration. For example, typical ionic emulsifiers include mono and di-alkyl sulfosuccinates, secondary alkane sulfonates, linear and branched alkylbenzene sulfonates. Often, both ionic and non-ionic mechanisms are used in combination to provide optimum stability.

Conventional non-ionic surfactants are generally water sensitive as a result of the incorporation of oxyethylene units into the surfactant structure. Examples of typical non-ionic surfactants include alkyl aryl ether alcohols based on octyl and nonyl phenol; alkyl aryl polyether alcohols based on octyl and nonyl phenol; alkyl phenol ethoxylates; fatty alcohol ethoxylates; ethylene oxide/propylene oxide copolymers; fatty acid ethoxylates; fatty acid ethylene oxide/propylene oxide copolymers; alkanol amides and ethoxylates and sorbitan esters and ethoxylates.

These approaches, however, are not without attendant difficulties. In coating applications, for example, formulating with such emulsion polymers which make use of these stabilizing mechanisms leads to cured films with increased water sensitivity. This is extremely disadvantageous in applications such as automotive coatings which require good water resistance of the coating.

There is a need, therefore, for a way to prepare aqueous emulsion polymers which are stable and also are capable of providing water resistant films.

SUMMARY OF THE INVENTION

In accordance with the present invention, there is provided a stable aqueous polymer emulsion comprising an aqueous continuous phase, a dispersed polymeric phase which comprises an acrylic polymer and a polyhydroxyl functional non-ionic surfactant having a repeating polymer unit in the backbone and containing from 3 to 31 hydroxyl groups wherein the hydroxyl groups on the repeating polymer unit are separated by 4 or more carbon atoms and the surfactant is substantially free of oxyethylene units.

DETAILED DESCRIPTION OF THE INVENTION

The precise nature of the dispersed polymeric phase is not critical to the present invention and accordingly may be selected from among several types of emulsion polymers. For the purposes of illustrating specific aspects of the claimed invention, aqueous acrylic or vinyl emulsion polymers will be discussed in detail as the dispersed polymeric phase. By way of illustration, therefore, the dispersed polymeric phase of the claimed aqueous polymer emulsion can be prepared from a mixture of monomers which is capable of free radical initiated polymerization in aqueous medium.

Suitable polymerizable monomers can be selected from a large number of materials, examples of which include vinyl monomers, such as acrylic monomers including alkyl esters of acrylic and methacrylic acid, such as methyl acrylate, methyl methacrylate, butyl acrylate, butyl methacrylate, 2-ethylhexyl acrylate, 2-ethylhexyl methacrylate, 2-hydroxyethyl acrylate, 2-hydroxyethyl methacrylate and hydroxypropyl methacrylate. Also suitable are styrene, acrylamide, acrylonitrile, alkyl esters of maleic and fumaric acid, vinyl and vinylidene halides, acrylic acid, ethylene glycol dimethacrylate, isobornyl methacrylate, vinyl acetate, vinyl ethers, allyl ethers, glycidyl acrylate, glycidyl methacrylate, lauryl methacrylate, N-butoxymethyl acrylamide as well as multifunctional acrylates and methacrylates. Preferably, the polymerizable monomers are hydrophobic materials which are essentially water insoluble, such as butyl acrylate and methyl methacrylate which have been mentioned above. Minor amounts of water soluble monomers such as hydroxyethyl acrylate, acrylic acid and acrylamide can be used without difficulty.

With regard to the amount of the polymerizable monomer component, it is usually used in amounts of from about 5 percent to about 60 percent, preferably 30 percent to 45 percent by weight based on the total weight of the aqueous emulsion which includes polymerizable monomer component, surfactant and aqueous medium.

The surfactant is a polyhydroxyl functional material which is non-ionic in character. By non-ionic is meant that the material does not readily form ions when dissolved in water or other appropriate solvent.

The surfactant is generally an oligomer or polymeric material having a repeating polymer unit in the backbone. Generally, it has a hydroxyl value of from about 200 to about 800, preferably from about 600 to about 800 and the hydroxyl groups on the repeating polymer unit are separated by 4 or more carbon atoms. The terminal hydroxyl group is not part of the repeating polymer unit. Moreover, the surfactant is substantially free of oxyethylene units. As used herein, an oxyethylene unit is represented by the following structural formula:

As used herein, "substantially free" means that the surfactant contains no more than 20 percent by weight of oxyethylene units based on the total weight of the surfactant. Preferably, the surfactant contains no oxyethylene units. This is important because the presence of greater amounts of oxyethylene units results in impaired water resistance properties.

The surfactant can be prepared by reacting an epoxide functional alcohol and an active hydrogen containing hydrophobic material. Examples of suitable epoxide functional alcohols include glycidol, 3-(hydroxymethyl)-3-methyl oxetane and 3,4-epoxy-1-butanol.

Examples of suitable active hydrogen containing hydrophobic materials include generally, amines, alcohols, mercaptans and acid functional materials having 8 or more carbon atoms. Specific examples include nonyl phenol, isononyl phenol, octyl phenol, cetyl phenol, hexadecyl phenol, neodecanoic acid, stearic acid, lauric acid, laurel mercaptan, laurel amine.

The surfactant of the present invention can be saturated or unsaturated so long as it satisfies the other characteristics set forth above. The surfactants generally can be prepared in the manner detailed below. It should be understood that these methods are illustrative and are not intended to be limiting. One skilled in the art can appreciate that variations in these methods are possible.

With regard to saturated surfactants, an active hydrogen containing hydrophobic material such as has been listed above is charged to a reactor vessel with a base such as 1 to 2 percent strength potassium or sodium hydroxide at about 50 percent solids in an inert organic solvent such as toluene. The mixture is then heated to reflux and all of the water associated with the ingredients is removed by distillation using a Dean Stark container or trap. The opoxide functional alcohol, for example glycidol, is added over a 2 to 4 hour period at a temperature in the range of from about 100° C. to about 130° C. Typically the opoxide is added as a 50 percent solution in a suitable solvent, for example toluene. The progress of the reaction can be monitored by measuring the opoxy equivalent weight of a sample of the reaction mixture. The reaction is considered complete when the epoxy equivalent weight reaches an infinitely large value. The reaction mixture is then cooled to a temperature ranging from the 50° C. to about 60° C. and the base neutralized with, for example, orthophosphoric acid. The salt formed is removed by filtration and the solvent by vacuum distillation. The product is typically dissolved in deionized water at 60 to 70 percent solids. Surfactants prepared in this fashion can be represented by the following general structure:

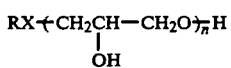

wherein X can be oxygen, sulfur, nitrogen or

R can be an alkyl group having preferably from eight to thirty-six carbons; and n is usually an integer from 1 to 25.

With regard to unsaturated surfactants, an epoxide functional alcohol such as those listed above is first homopolymerized in the presence of 1 to 2 percent based on solids of benzyl dimethylamine catalyst at a temperature of from about 80° C. to 100° C. in an inert organic solvent such as toluene. The completion of this reaction is monitored by epoxy equivalent weight, a value between 300 and 2000 generally being an acceptable indicia of reaction completion. The reaction is then quenched by the addition of an unsaturated acid or unsaturated amine such as methacrylic acid or diallyl amine, respectively. An inhibitor such as 2,6-di-tertiary butyl paracresol is generally added at a level of 0.05 percent based on solids to prevent polymerization of the double bond of the quenching unsaturated acid or amine. The reaction is monitored by measuring the decrease in acid value and increase in epoxy equivalent weight at selected intervals. Upon completion of the reaction, the solvent is removed by vacuum distillation and the resultant product, which can be prepared at solids levels as high as 100 percent, as recovered.

The general structure of these materials can be represented by the structural formula below:

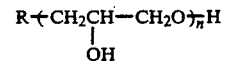

wherein R can be an alkyl acrylate or methacrylate group, vinyl ester group or amino group, and n is an integer of 2 to 30.

With regard to the conditions of the polymerization, the vinyl monomer component used to prepare the vinyl polymer selected for illustration of a suitable dispersed polymer phase is polymerized in the aqueous continuous phase with a free radical initiator and in the presence of the surfactant which has been described fully above. The temperature of polymerization is typically from about 40° C. to about 85° C., usually from about 60° C. to about 80° C. and the pH of the aqueous phase is usually maintained from about 2 to about 10 depending upon the radical species.

The free radical initiator can be selected from a variety of materials which are known to act as free radical initiators and which are soluble in aqueous phase. Examples include the persulfates such as ammonium, sodium and potassium persulfate. Also, oil-soluble initiators may be employed either alone or in addition to the water soluble initiators. Typcial oil-soluble initiators include organic peroxides such as benzoyl peroxide, t-butyl hydroperoxide and t-butyl perbenzoate. Azo compounds such as azobisisobutyronitrile can also be used as well as a variety of redox initiators. Examples of redox initiators include (iron/hydrogen peroxide, isoascorbic acid/hydrogen peroxide) and sodium formaldehyde sulfoxalate.

The polymerization may be conducted as batch, intermittent or a continuous operation or a combination of aspects of these techniques. While all of the polymerization ingredients may be charged initially to the polymerization vessel, better results normally are obtained with proportioning techniques.

For polymerization of the monomer component in the presence of the surfactant, the aqueous phase preferably should be present in amounts from about 10 to 60, more preferably 20 to 50 percent by weight based on total weight of the aqueous medium and surfactant.

Besides water, the aqueous continuous phase can contain some organic co-solvents. The organic co-solvents re preferably soluble or miscible with water. Examples of such solvents include oxygenated organic solvents such as mono alkyl ethers of ethylene glycol and diethylene glycol which contain from 1 to 4 carbon atoms in the alkyl groups such as the mono ethyl and mono butyl ethers of ethylene glycol and diethylene glycol. Examples of other water soluble solvents include alcohols such as ethanol, isopropoanol, tertiary butanol and diacetone alcohol. Preferably, the water soluble oxygenated organic solvents should be present in amounts less than 30 percent and more preferably less than 5 percent by weight based on the total weight of the aqueous phase.

Minor amounts, that is less than 5 percent by weight based on the total weight of the aqueous phase, of non polar, water immiscible solvents such as aliphatic, cycloaliphatic and aromatic hydrocarbons such as hexane and cyclohexane may also be used in the aqueous phase.

Typically, the reactor vessel is charged with an appropriate amount of aqueous continuous phase, surfactant and monomer. The reactor is then heated to the polymerization reaction temperature and charged with a part of the intitiator. Preferably only aqueous phase, initiator and the surfactant and part of the monomer component are initially charged to the reactor. After this initial charge (see stage) has been allowed to react for a period of time, the remaining monomer component is added incrementally with the rate of addition being varied depending upon the polymerization temperature, the particular initiator employed and the type, amount and reactivity of monomers being polymerized. After all of the monomer component has been charged, a final heating is usually done to complete the polymerization, the reactor is then cooled and the emulsion filtered. If desired, other techniques well known to those skilled in the art can be utilized the emulsion polymer prepared according to the present invention is a stable polymer. By stable is meant that the dispersion is essentially free of grit and the polymer will not gel, flocculate, precipitate or cream at a temperature of 25° C. for at least several months.

The stable emulsion polymers of the present invention are useful in formulating both thermoplastic and thermosetting waterborne coating compositions although the advantageous properties resulting from the use of these emulsion polymers are more pronounced in thermosetting compositions.

Thermoplastic water borne coating compositions may be prepared simply by applying the emulsion polymer to a substrate and evaporating the aqueous medium either at ambient temperature or at elevated temperature, for example, 25° C. to 300° C.

In formulating thermosetting waterborne coating compositions, it is generally desirable to have at least a portion of the monomer component be active hydrogen or epoxy functional in order to provide crosslinking sites in the polymer. The emulsion polymer can be combined with a suitable crosslinking agent such as blocked polyisocyanate or aminoplast, and other suitable additives as desired. The crosslinking agent is adapted to crosslink both the emulsion polymer and the polyhydroxy functional surfactant into the film. Typically, the stable emulsion polymer is combined with other oligomeric or polymeric materials such as polyesters and polyurethanes which after crosslinking result in excellent coating films having good physical properties in addition to good water resistance.

The coating compositions can be clear or pigmented and when pigmented may be pigmented with any of the conventional materials available.

In addition, various additives such as filler, plasticizers, waxes, antioxidants, ultraviolet light absorbers, defoamers, fungicides, flow control agents, conventional surfactants and other formulating additives may be utilized if desired.

The coating compositions can be applied to a variety of substrates including wood, metal, glass, cloth, plastics and the like by any of a variety of application techniques including spray, dip, brush, roller or electrodeposition.

The stable emulsion polymers of the present invention result in coating compositions having excellent physical properties including good adhesion, water resistance, hardness, flexibility and durability.

The following examples illustrate the invention and are not meant to be limiting.

EXAMPLE 1

Synthesis of Nonionic Polyhydroxyl Functional Surfactant

|  | Parts by Weight (grams) |
| --- | --- |
| Charge |  |
| Nonyl phenol | 232.0 |
| Potassium Hydroxide | 50.6 |
| Toluene | 258.0 |
| Feed A |  |
| Glycidol (50% solution in Toluene) | 2680.0 |

A reactor vessel containing the charge was heated to reflux under an inert atmosphere of nitrogen and all of the water associated with KOH and toluene was azeotroped. Feed A was then added into the vessel over 4–6 hours and the progress of the reaction was monitored by measuring epoxy equivalent weight. When the epoxy equivalent weight reached infinity the base potassium hydroxide was neutralized by adding 58.4 grams of phosphoric acid. About 300–500 grams of toluene and 600 grams of ethanol were added to the reaction vessel in order to precipitate the salt formed by potassium hydroxide and phosphoric acid. The salt was removed by filtration and the solvent from the filtrate (product) was removed by distillation. The liquid product had a total solids content of 95.0% determined at 110° C. for one hour and a hydroxyl value of 716.3.

Deionized water was then added to the reaction product resulting in a total solids content of 58.3%. The product had the following structure.

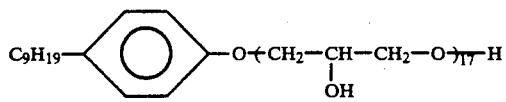

EXAMPLE 2

Polyhydroxyl Allyl Functional Nonionic Surfactant

|  | Parts by Weight (grams) |
| --- | --- |
| Charge |  |
| Nonyl phenol | 440.7 |

-continued

| | Parts by Weight (grams) |
|---|---|
| Potassium Hydroxide | 32.5 |
| Toluene | 400.0 |
| Feed A | |
| Allyl Glycidyl Ether | 114.1 |
| Feed B | |
| (50% solution in Toluene) Glycidol | 2680.0 |
| Feed C | |
| Deionized Water | 161.7 |
| Feed D | |
| (85%) phosphoric acid | 38.3 |

In a suitable reactor vessel the charge was heated to reflux under nitrogen atmosphere and water was removed by Dean stark flask. Feed A was added to the charged vessel over 3 hours and held until the epoxy equivalent weight reached infinity. The Feed B was added over 2 hours. When the epoxy equivalent weight reached infinity Feeds C and D were added. The salt thus formed by potassium hydroxide and phosphoric acid was removed by filtration. All the solvents from the filtrate were removed by distillation. The reaction product had a total solids content of 95% determined at 110° C. for one hour, a number average molecular weight 717 and a weight average molecular weight of 988. [Molecular weight was determined by Gel Permeation Chromatography (GPC) using a polystyrene standard.] The product had the following structure.

$$CH_2=CH-CH_2O-CH_2-CH-CH_2-O-C_6-H_4-C_9H_{19}$$
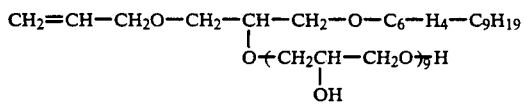

EXAMPLE 3

This surfactant was prepared in a manner similar to Example 2, except that allyl glycidyl ether was replaced by glycidyl methacrylate. The product had a total solids content of 97 percent in ethanol.

EXAMPLE 4

Polyhydroxyl Methacrylate Unsaturated Nonionic Surfactant

| | Parts by Weight (grams) |
|---|---|
| Charge | |
| Glycidol (50% solution in Toluene) | 675.0 |
| n-methyl pyrrolidone | 250.0 |
| Feed A | |
| Benzyl dimethylamine | 6.7 |
| Feed B | |
| 2,6, di-tert-butyl-p-cresol | 0.67 |
| Feed C | |
| methacrylic acid | 48.2 |

Feed A and the Charge were mixed together into the reaction vessel and slowly heated to 106° C. The polymerization of the glycidol was monitored by measuring epoxy equivalent weight. When the epoxy equivalent weight reached 1,676, Feeds B and Feed C were added dropwise over 30 minutes. The completion of the reaction was monitored by measuring the drop in acid value. At the end of the reaction, solvents were removed by vacuum distillation. The reaction product had a total solids content of 85.2% in n-methyl pyrrolidone determined at 110° C. for one hour and an acid value of 0.08. The product had the following general structure.

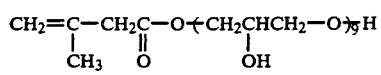

EXAMPLE 5

Comparative Example

Preparation of Latex Using Conventional Non-ionic Surfactant

| | Parts by Weight (grams) |
|---|---|
| Charge | |
| Deionized Water | 2760.0 |
| Sodium Lauryl Sulfate | 4.533 |
| (30% solution in water) | |
| sodium bicarbonate | 2.38 |
| Feed A | |
| Deionized Water | 69.0 |
| ammonium peroxydisulfate | 13.6 |
| Feed B | |
| Methyl Methacrylate | 1683.0 |
| Ethyl Acrylate | 697.0 |
| Styrene | 357.0 |
| Hydroxy Ethyl Methacrylate | 527.0 |
| Acrylic Acid | 102.0 |
| Pentaerythritol triacrylate | 34.0 |
| Deionized Water | 1771.0 |
| Sodium Lauryl Sulfate | 34.0 |
| (30% solution in water) | |
| TRITON N101* | 34.0 |

*This surfactant was nonyl phenol polyethylene oxide from Rohm and Haas.

The charge in the vessel was heated and agitated under a nitrogen atmosphere to a temperature of 80° C. followed by the addition of 131.0 grams of Feed B. After a 5 minute hold, Feed A was added and the reaction contents were held for one half hour. Thereafter the addition of Feed B was commenced and continued over a 3 hours period. The reaction mixture was held for about 45 minutes and the resultant acrylic latex was allowed to cool, discharged and analyzed. The latex had a total solids content of 42.5% determined at 110° C. for one hour, a pH of 3.7, an acid value of 11.2 and a particle size of 1820 Angstroms. Particle size was determined using a Coulter Model NT instrument by Coulter Electronics, Halileah, Fla.

EXAMPLE 6

Preparation of Latex Using Surfactant from Example 1

Same as in Example 4, except polyhydroxy, nonyl phenol-glycidol, surfactant was used in place of Triton N101.

EXAMPLE 7A & B

Comparison of Water Sensitivity of Examples 5 and 6

| 7A | 7B |
|---|---|
| Example 4 - 40.6 parts | Example 5 - 40.6 parts |
| Deionized Water - 10.0 parts | Deionized Water - 10 parts |
| Pre-Mix then add: | Pre-Mix then Add: |
| Deionized Water - 5.5 parts | Deionized Water - 5.5 parts |
| Dimethylethanolamine - 0.8 parts | Dimethylethanolamine - 0.8 parts |

-continued

| 7A | 7B |
|---|---|
| Pre-Mix then add:<br>Ethylene glycol monobutyl<br>ether - 1.725 parts<br>RESIMENE 717* - 8.9 parts | Pre-Mix then Add:<br>Ethylene glycol monobutyl<br>ether - 1.725 parts<br>RESIMENE 717 - 8.9 parts |

(*aminoplast crosslinker from Monsanto)

The solid content of each of the above paints was 34.06% and the pH was 7.6.

Each paint was drawn down over a glass substrate with a 6 mil (wet) draw bar and baked horizontally for 30 minutes at 250° F. (121° C.).

The cured paints on glass were immersed into 60° C. tap water for 24 hours. The appearance of the panels was examined every 6 hours for blushing and blistering.

| Example | 6 HRS | 12 HRS | 18 HRS | 24 HRS |
|---|---|---|---|---|
| 7A | Slight Blush | Increased Blushing<br>Blistering | | Severe Blush<br>Severe Blistering |
| 7B | No Blush | Slight Blush<br>No Blistering in 7B after 24 hours | Slight Blush | Slight Blush |

The data above shows that coating compositions prepared from emulsions of the present invention exhibited better humidity resistance than those conventionally prepared.

What is claimed is:

1. A stable aqueous polymer emulsion comprising an aqueous continuous phase, a dispersed polymer phase which comprises an acrylic polymer and a polyhydroxyl functional non-ionic surfactant having a repeating polymer unit in the backbone and containing from 3 to 31 hydroxyl groups wherein the hydroxyl groups on the repeating polymer unit are separated by 4 or more carbon atoms and the surfactant is substantially free of oxyethylene units.

2. The polymer emulsion of claim 1 wherein the polyhydroxyl functional surfactant is prepared from an epoxide functional alcohol and an active hydrogen containing hydrophobic material.

3. The polymer emulsion of claim 2 wherein the polyhydroxyl functional surfactant is prepared from nonyl phenol and glycidol.

4. The polymer emulsion of claim 1 wherein the surfactant has a hydroxyl value of from about 200 to about 800.

5. The polymer emulsion of claim 1 wherein the surfactant contains no more than 20 percent by weight of oxyethylene units, based on the total weight of the surfactant.

6. The polymer emulsion of claim 1 wherein the surfactant is saturated.

7. The polymer emulsion of claim 1 wherein the surfactant is unsaturated.

* * * * *